US009992392B2

(12) United States Patent
Byrne et al.

(10) Patent No.: US 9,992,392 B2
(45) Date of Patent: Jun. 5, 2018

(54) CAMERA FOR VEHICULAR APPLICATIONS

(71) Applicant: MAGNA ELECTRONICS INC., Auburn Hills, MI (US)

(72) Inventors: Steven V. Byrne, Goodrich, MI (US); Ben Stickler, Plymouth, MI (US); Richard Rieden, Clinton Township, MI (US); Matthew C. Sesti, Williamston, MI (US); Brian D. Brasier, Howell, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 16 days.

(21) Appl. No.: 15/180,644

(22) Filed: Jun. 13, 2016

(65) Prior Publication Data
US 2016/0301837 A1  Oct. 13, 2016

Related U.S. Application Data

(63) Continuation of application No. 14/672,699, filed on Mar. 30, 2015, now Pat. No. 9,365,160, which is a continuation of application No. 13/936,708, filed on Jul. 8, 2013, now Pat. No. 8,994,878, which is a continuation of application No. 12/580,496, filed on Oct. 16, 2009, now Pat. No. 8,482,664.

(Continued)

(51) Int. Cl.
*H04N 5/225* (2006.01)
*B60R 11/04* (2006.01)
*B60R 1/00* (2006.01)

(52) U.S. Cl.
CPC ............. *H04N 5/2254* (2013.01); *B60R 1/00* (2013.01); *B60R 11/04* (2013.01); *H04N 5/2252* (2013.01); *H04N 5/2253* (2013.01); *B60R 2300/8006* (2013.01); *B60R 2300/8026* (2013.01)

(58) Field of Classification Search
CPC ...... H04N 5/2252; H04N 5/2253; B60R 1/04; B60R 2300/8086
See application file for complete search history.

(56) References Cited

U.S. PATENT DOCUMENTS 4,634,884 A    1/1987  Hayashimoto
5,130,804 A    7/1992  Tamura
(Continued)

*Primary Examiner* — Ahmed A Berhan
(74) *Attorney, Agent, or Firm* — Honigman Miller Schwartz and Cohn, LLP

(57) ABSTRACT

A vehicular camera assembly for a vehicle vision system includes front and rear housing members, a lens assembly and a circuit board. An imaging element is disposed on a first side of the circuit board and a plurality of electrical connectors is disposed on a second side of the circuit board. The front housing member includes a lens assembly receiving portion and a circuit board attachment portion. With the circuit board attached at the front housing member and with the lens assembly received at the lens assembly receiving portion, the lens assembly and the imaging element are distanced from one another, and images are focused on the imaging element by the lens assembly. The front housing member and the rear housing member are configured to be attached together. With the front and rear housing members attached together, outer walls of the front and rear housing members enclose the circuit board.

34 Claims, 6 Drawing Sheets

Related U.S. Application Data

(60) Provisional application No. 61/148,568, filed on Jan. 30, 2009, provisional application No. 61/105,852, filed on Oct. 16, 2008.

(56) References Cited

U.S. PATENT DOCUMENTS

| | | | |
|---|---|---|---|
| 5,204,615 | A | 4/1993 | Richards |
| 5,550,677 | A | 8/1996 | Schofield et al. |
| 5,670,935 | A | 9/1997 | Schofield et al. |
| 5,796,094 | A | 8/1998 | Schofield et al. |
| 5,920,061 | A | 7/1999 | Feng |
| 6,087,953 | A | 7/2000 | DeLine et al. |
| 6,097,023 | A | 8/2000 | Schofield et al. |
| 6,151,065 | A * | 11/2000 | Steed .................. B60Q 1/0023 348/148 |
| 6,172,613 | B1 | 1/2001 | DeLine et al. |
| 6,259,475 | B1 | 7/2001 | Ramachandran et al. |
| 6,278,377 | B1 | 8/2001 | DeLine et al. |
| 6,326,613 | B1 | 12/2001 | Heslin et al. |
| 6,396,397 | B1 | 5/2002 | Bos et al. |
| 6,428,172 | B1 | 8/2002 | Hutzel et al. |
| 7,095,572 | B2 | 8/2006 | Lee et al. |
| 7,215,479 | B1 | 5/2007 | Bakin |
| 7,255,451 | B2 | 8/2007 | McCabe et al. |
| 7,289,037 | B2 | 10/2007 | Uken et al. |
| 7,339,149 | B1 | 3/2008 | Schofield et al. |
| 7,480,149 | B2 | 1/2009 | DeWard et al. |
| 7,536,316 | B2 | 5/2009 | Ozer et al. |
| 7,665,915 | B2 | 2/2010 | Lee |
| 7,697,056 | B2 | 4/2010 | Huang |
| 7,965,336 | B2 | 6/2011 | Bingle et al. |
| 8,256,821 | B2 | 9/2012 | Lawlor et al. |
| 8,482,664 | B2 | 7/2013 | Byrne et al. |
| 8,542,451 | B2 | 9/2013 | Lu et al. |
| 8,994,878 | B2 | 3/2015 | Byrne et al. |
| 9,365,160 | B2 | 6/2016 | Byrne et al. |
| 9,487,159 | B2 | 11/2016 | Achenbach |
| 9,596,387 | B2 | 3/2017 | Achenbach et al. |
| 2002/0167605 | A1 | 11/2002 | Akimoto et al. |
| 2002/0175832 | A1* | 11/2002 | Mizusawa .............. G08G 1/081 340/908.1 |
| 2005/0141106 | A1 | 6/2005 | Lee et al. |
| 2006/0061008 | A1 | 3/2006 | Karner et al. |
| 2006/0077575 | A1 | 4/2006 | Nakai et al. |
| 2006/0103727 | A1 | 5/2006 | Tseng |
| 2006/0171704 | A1 | 8/2006 | Bingle et al. |
| 2007/0040034 | A1* | 2/2007 | Hennick ............ G06K 7/10732 235/462.41 |
| 2008/0122965 | A1* | 5/2008 | Fang .................. H04N 1/00204 348/333.06 |
| 2009/0244361 | A1* | 10/2009 | Gebauer .............. H04N 5/2253 348/373 |
| 2009/0295181 | A1 | 12/2009 | Lawlor et al. |
| 2010/0015713 | A1 | 1/2010 | Deeter et al. |
| 2010/0097519 | A1 | 4/2010 | Byrne et al. |
| 2010/0279439 | A1 | 11/2010 | Shah et al. |
| 2011/0025850 | A1 | 2/2011 | Maekawa et al. |
| 2012/0081550 | A1 | 4/2012 | Sewell |
| 2012/0265416 | A1 | 10/2012 | Lu |
| 2014/0313337 | A1 | 10/2014 | Devota et al. |
| 2015/0327398 | A1 | 11/2015 | Achenbach et al. |

* cited by examiner

CAMERA FOR VEHICULAR APPLICATIONS

CROSS REFERENCE TO RELATED APPLICATIONS

This application is a continuation of U.S. patent application Ser. No. 14/672,699, filed Mar. 30, 2015, now U.S. Pat. No. 9,365,160, which is a continuation of U.S. patent application Ser. No. 13/936,708, filed Jul. 8, 2013, now U.S. Pat. No. 8,994,878, which is a continuation of U.S. patent application Ser. No. 12/580,496, filed Oct. 16, 2009, now U.S. Pat. No. 8,482,664, which claims the benefits of U.S. provisional application Ser. No. 61/148,568, filed Jan. 30, 2009, and U.S. provisional application Ser. No. 61/105,852, filed Oct. 16, 2008.

FIELD OF THE INVENTION

The present invention relates to a camera for use in vehicles, and more particularly rearview cameras for use in vehicles.

BACKGROUND OF THE INVENTION

A typical camera for mounting on a vehicle has a lens member, an imaging element, a circuit board and housing members that connect together. It is generally desirable to reduce the cost of manufacture of such cameras and to improve their reliability.

As an example, some cameras may use an epoxy to mount the lens member to the front housing member. However, the epoxy that is used may be susceptible to softening under high temperature, at which point the lens member becomes vulnerable to being moved out of focus with the imaging element. It would be desirable to reduce the vulnerability of the lens member to movement under high temperature.

Another problem with some cameras relates to the cable that exits the camera and extends to other vehicular components. A camera may be positioned within a protective housing, which may be closed about the camera or sensor and secured together. The camera includes a wire harness or wire or lead electrically connected to circuitry of the camera and extending through the camera housing for electrical connection to a vehicle wire harness or the like.

A need exists for an inexpensive camera cable exit strategy that is space efficient, hermetically sealed, provides substantial of cable strain relief in any axis (such as, for example, more than about 110 N of cable strain relief in any axis), and can withstand the stresses of automotive environmental conditions. Currently used grommets in the industry tend to leak when subjected to off axis stresses. Also, many existing exit strategies incorporate additional and complex contact interfaces along the conductive paths from wire to board so that pins or specific terminals are introduced which can be press-fit or over-molded into a sealed plastic interface. This may increase cost, complexity and quality risks associated with the camera cable.

It would be advantageous to provide a camera that addresses one or more of these and other considerations.

SUMMARY OF THE INVENTION

In a first aspect, the invention is directed to a camera for mounting on a vehicle, wherein the camera housing made up of two housing members, with a conductive coating on the interior of each of the housing members. The two housing members mate together using an interference fit, to provide a greater assurance that they are electrically connected to each other. One of the housing members is connected to ground.

In a particular embodiment of the first aspect, the camera includes a front housing member, a lens member, an imaging element, a circuit board and a rear housing member. The front housing member has a front housing member interior surface that has a front housing member coating of electrically conductive material thereon. The lens member is mounted to the front housing member. The imaging element is positioned to receive images from the lens member. The circuit board is configured to send to another component signals relating to images received by the imaging element. The rear housing member has a rear housing member interior surface that has a rear housing member coating thereon. The front housing member and the rear housing member are sized to mate together with an interference fit such that the front housing member coating and the rear housing member coating engage each other. One of the front and rear housing member coatings is electrically connectable to ground.

In a second aspect, the invention is directed to a camera for a vehicle, having a lens member that is movable to a selected position on the front housing member, optionally by means of engagement of a threaded portion on the lens member and a corresponding threaded portion on the front housing member. The lens member is holdable in the selected position by an interference fit.

In a particular embodiment of the first aspect, the camera includes a front housing member, a lens member, an imaging element and a circuit board. The front housing member has a lens member receiving aperture therein having a front housing member threaded portion, and a front housing member locking portion. The lens member is mounted to the front housing member. The lens member has a lens member threaded portion for mating with the front housing member threaded portion, and a lens member locking portion. The lens member locking portion and the front housing member locking portion are sized to mate together with an interference fit to hold the lens member in a selected position relative to the front housing member. The imaging element is positioned to receive video input from the lens member. The circuit board is configured to send to another component signals relating to video input received by the imaging element.

In another aspect, the present invention provides a camera module that has a housing and a wire harness or wire or lead that is electrically connected to circuitry of the camera and that extends through the camera housing for electrical connection to a vehicle wire harness or the like. The wire or lead extends through a portion of the housing with the housing disposed at the wire prior to connection of the wire to the circuitry of the camera. The electrical connection of the wire to the camera circuitry is made as the housing is assembled. The joint at where the wire extends outward from the housing portion is sealed, such as via shrink wrapping or the like.

According to another aspect of the present invention, a camera module for a vision system of a vehicle includes a circuit board, a lens holder or lens mounting assembly for mounting a lens assembly, and an outer shell or housing portion. The circuit board includes a lens assembly, an imaging sensor and associated circuitry. The outer shell or housing portion includes first and second housing portions, with a wire or lead extending through the first housing portion for connection to the circuit board. The wire includes a connector at the first housing portion that is configured to connect to a connecting element at the circuit board when the first and second housing portions are assembled together to encompass or house the circuit board within the outer shell or housing portion.

The outer shell or housing portion may comprise a lens receiving portion and a cable receiving portion, with the lens receiving portion and the cable receiving portion being connected together to substantially house the circuit element within the housing portion. The cable receiving portion includes a connector receiving portion and a wire receiving portion, with the connector receiving portion being formed to receive and retain the cable connector therein and the wire receiving portion being formed to receive and retain the cable portion therein.

These and other objects, advantages, purposes and features of the present invention will become apparent upon review of the following specification in conjunction with the drawings.

BRIEF DESCRIPTION OF THE DRAWINGS

The present invention will now be described by way of example only with reference to the attached drawings, in which:

FIG. 1b is a sectional view along section line 1b-1b shown in FIG. 1a;

DETAILED DESCRIPTION OF THE INVENTION

Figure 1A:
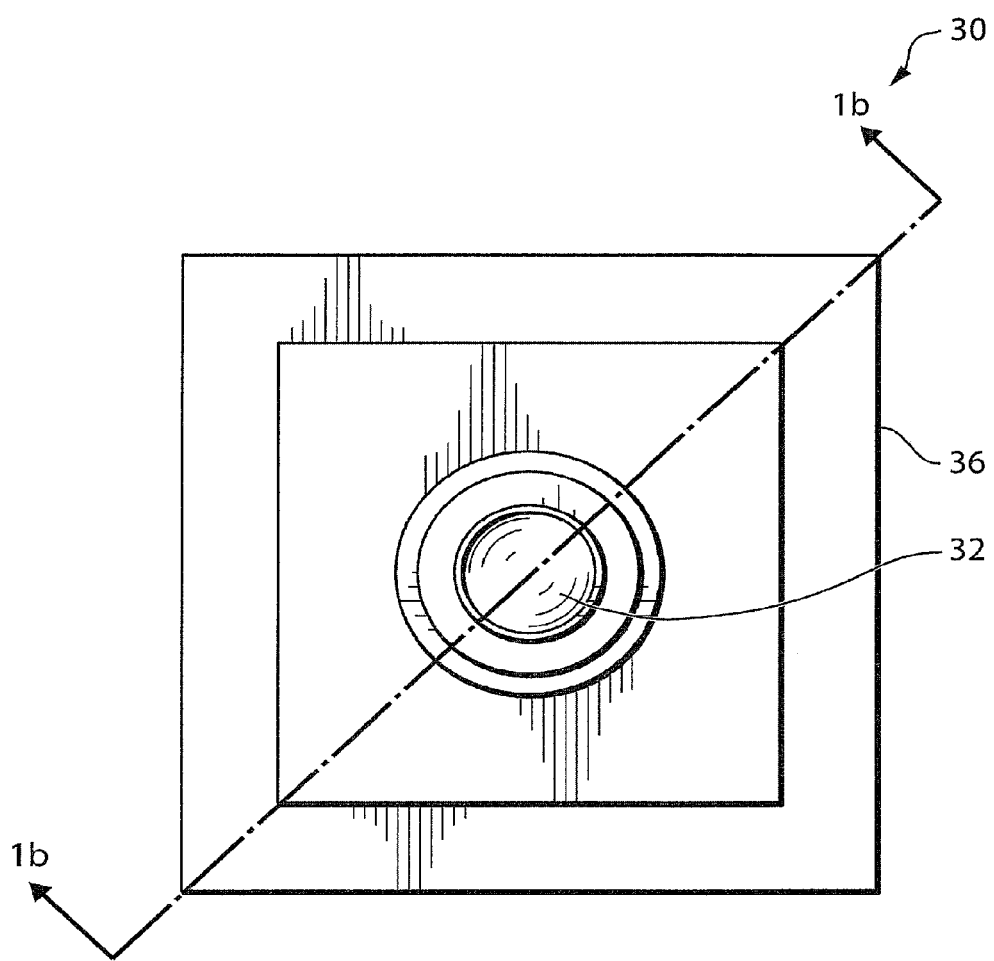
FIG. 1a is a front end view of a camera for a vehicle in accordance with an embodiment of the present invention.
Figure 1B:
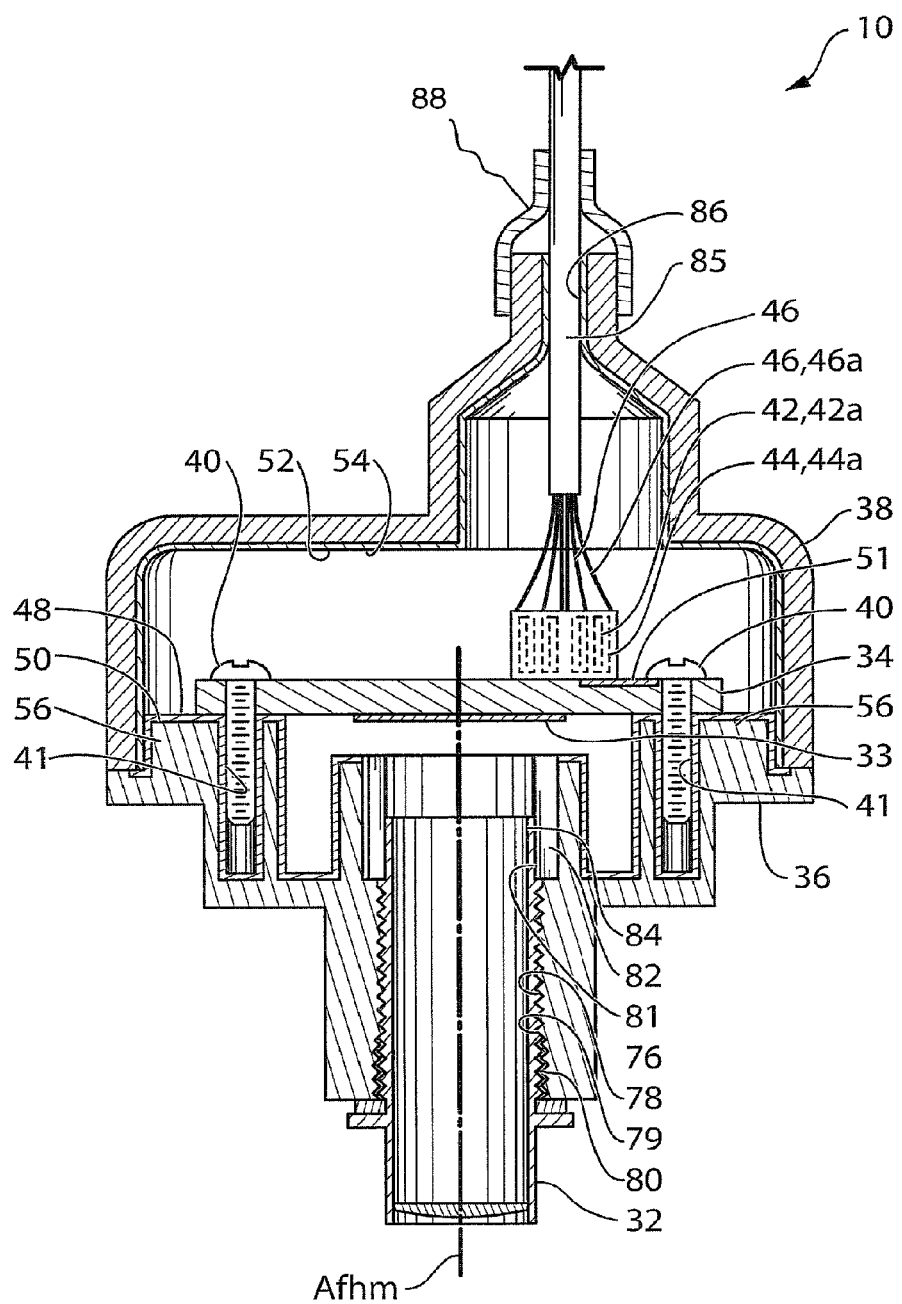

Reference is made to FIG. 1a, which shows a camera 30 for use in a vehicle, and in particular for use as a rearview camera in a vehicle, in accordance with an embodiment of the present invention. In one aspect, the camera 30 is configured to provide grounding protection and electromagnetic compatibility (EMC) protection simply and without adding to the complexity of the assembly. Referring to FIG. 1b, which is a sectional view of the camera 30, the camera 30 includes a lens 32, an imaging element 33, a circuit board 34, a front housing member 36 and a rear housing member 38.

Note that the terms 'front' and 'rear' as used in the present document refer to the front of the camera 30 (i.e. the portion of the camera where the lens member is located), and the rear of the camera 30 (i.e. the portion of the camera 30 opposite the front of the camera 30). When the camera 30 is used in a rearview application in a vehicle, the front of the camera 30 thus faces rearwardly relative to the vehicle and the rear of the camera 30 faces towards the front of the vehicle.

The lens member 32 may be any suitable lens member known in the art, and is mounted to the front housing member 36. The imaging element 33 is positioned in a selected position to receive images through the lens member 32. The imaging element 33 may be any suitable imaging element a charge-coupled device (CCD) or a complimentary metal-oxide semiconductor (CMOS) sensor. The circuit board 34 receives signals from the imaging element 33 and sends signals relating to images received on the imaging element 33 to one or more other components such as another computing device within the vehicle. The imaging element 33 may be mounted directly on the circuit board 34.

The circuit board 34 may be mounted to the front housing member 36 in any suitable way. For example, the circuit board 34 may be mounted to the front housing member 36 by a plurality of circuit board mounting fasteners 40, which may be mechanical fasteners such as machine screws that engage apertures 41 (e.g. threaded apertures) on the front housing member 16. A plurality of front electrical connectors 42 are provided on the circuit board 34.

The rear housing member 38 houses a plurality of rear electrical connectors 44 that are electrically connected at their front ends to the front electrical connectors 42 on the circuit board 34 and at their rear ends to a plurality of electrical conduits 46, which connect the circuit board 34 to associated elements in the vehicle.

The front electrical connectors 42 may be male electrical connectors, and the rear electrical connectors 44 may be female electrical connectors that receive the male front electrical connectors 42 as shown in FIG. 1b.

While a plurality of front and rear electrical connectors 42 and 44 are shown, it is alternatively possible for the camera 30 to have as few as one front electrical connector 42, one rear electrical connector 44 and one electrical conduit 46.

The front and rear housing members 36 and 38 may be made from any suitable material, such as a polymeric material. In instances wherein the front and rear housing members 36 and 38 may build up a static electrical charge it is preferable to provide means to inhibit such a buildup so as to protect components such as the circuit board 34. To inhibit the buildup of static electricity on the front housing member 36, a front housing member coating 48 of electrically conductive material may be provided on the front housing member interior surface, shown at 50. The aperture 41 may have the front housing member coating 36 thereon so that the circuit board mounting fastener 40 is in direct contact with the front housing member coating 36. The circuit board mounting fastener 40 may be made from an electrically conductive material. One of the front electrical connectors 42 may be a front ground connector 42a, and connects to a rear ground connector 44a, which in turn connects to a ground point within the vehicle (not shown) through one of the electrical conduits, shown at 46a. The front ground connector 42a may be electrically connected to the front housing member coating 36 any suitable way. For example, the front ground connector 42a may be electrically connected to the circuit board mounting fastener 40 by an electrical trace shown at 51 on the circuit board 34 or by some other suitable electrical conduit. The front ground connector 42a thereby conducts any buildup of electricity away from the front housing member 36 to the rear ground connector 44a, which in turn conducts the electricity to a ground point in the vehicle. The front housing member coating 36 may be any suitable material, such as Aluminum.

To inhibit the buildup of static electricity on the rear housing member 38, a rear housing member coating 52 of electrically conductive material may be provided on the rear housing member interior surface, shown at 54. The rear housing member coating 52 may be electrically (and physically) connected to the front housing member coating through engagement between the rear housing member interior surface 54 with a plurality of engagement ribs 56 on the front housing member interior surface 50, which have the front housing member coating 48 thereon. The engagement ribs 56 are more clearly shown in FIG. 2. Referring to FIG. 1b, to provide a relatively greater assurance of electrical communication between the rear and front housing member interior surfaces 54 and 48, the rear housing member interior surface 54 and the engagement ribs 56 may be sized to have an interference fit therebetween.

Any electrical charge that is built up on the rear housing member 38 is conducted away by the rear housing member coating 52 to the front housing member coating 48, through the electrically conductive circuit board mounting fastener 40, along the aforementioned electrical trace 51, through the front and rear electrical connectors 42a and 44a, through the ground conduit 46a out to ground at a suitable location in the vehicle. While three engagement ribs 56 are shown at two opposing corners of the front housing member 36, any suitable number of ribs 56 may be provided. The engagement between the ribs 56 and the rear housing member 38 align the rear housing member 38 with respect to the front housing member 36.

After the front and rear housing members 36 and 38 are mated together using the engagement ribs 56, they may be further joined by means of welding, adhesive, or any other suitable means.

In addition to providing a means for grounding the front and rear housing members 36 and 38, the front and rear housing member coatings 48 and 52 also provide EMC protection to the circuit board 34.

After the housing members 36 and 38 are mated together they may be further joined together by means of welding, adhesive or any other suitable means.

Referring to FIG. 1b, the structure shown for holding the lens member 32 in position relative to the front housing member 36 is shown, in accordance with another aspect of the present invention. The camera 30 is configured to hold the lens member 32 in position securely even at relatively high temperatures, such as temperatures that exceed 85 degrees Celsius.

The lens member 32 and the imaging element 33 are mounted at a selected distance from one another so as to focus images received by the lens member 32 on the imaging element 33. As noted above, the imaging element 33 may be mounted on the circuit board 34, which may itself be mounted at a fixed position on the front housing member 36 by any suitable means, such as by the plurality of circuit board mounting fasteners 40 which are received in the plurality of apertures 41 in the front housing member 36. To provide some adjustability for setting the distance between the lens member 32 and the imaging element 33, the lens member 32 may have thereon a threaded portion 76 that is received in an internally threaded portion 78 in the lens member receiving aperture, shown at 79, on the front housing member 36. In addition to the engagement of the threaded portions 76 and 78, a suitable bonding agent, shown at 80, such as an epoxy that is cured using ultra-violet (UV) light, may be applied between the lens member 32 and the front housing member 36 to retain the lens member 32 in a selected position relative to the imaging element 33. Additionally, the front housing member 36 may include a front housing member locking portion 81 with a plurality of lens member engagement ribs 82 thereon that are positioned and sized to form an interference fit with a lens member locking portion 84 on the lens member 32. The lens member engagement ribs 82 are shown more clearly in FIG. 2. In the embodiment shown in FIG. 2, three engagement ribs 82 are provided. In embodiments wherein three engagement ribs 82 are provided, they may be spaced about the perimeter of the lens member receiving aperture 79 sufficiently to hold the lens member 32 (FIG. 1b) centered with respect to the front housing member axis, shown at Afhm. A sufficient spacing for this purpose would be provided if the maximum angular spacing between any two adjacent engagement ribs 82 were less than 180 degrees of the lens member receiving aperture 79. In the embodiment shown, the spacing between any two adjacent engagement ribs 82 is 120 degrees.

Figure 2:
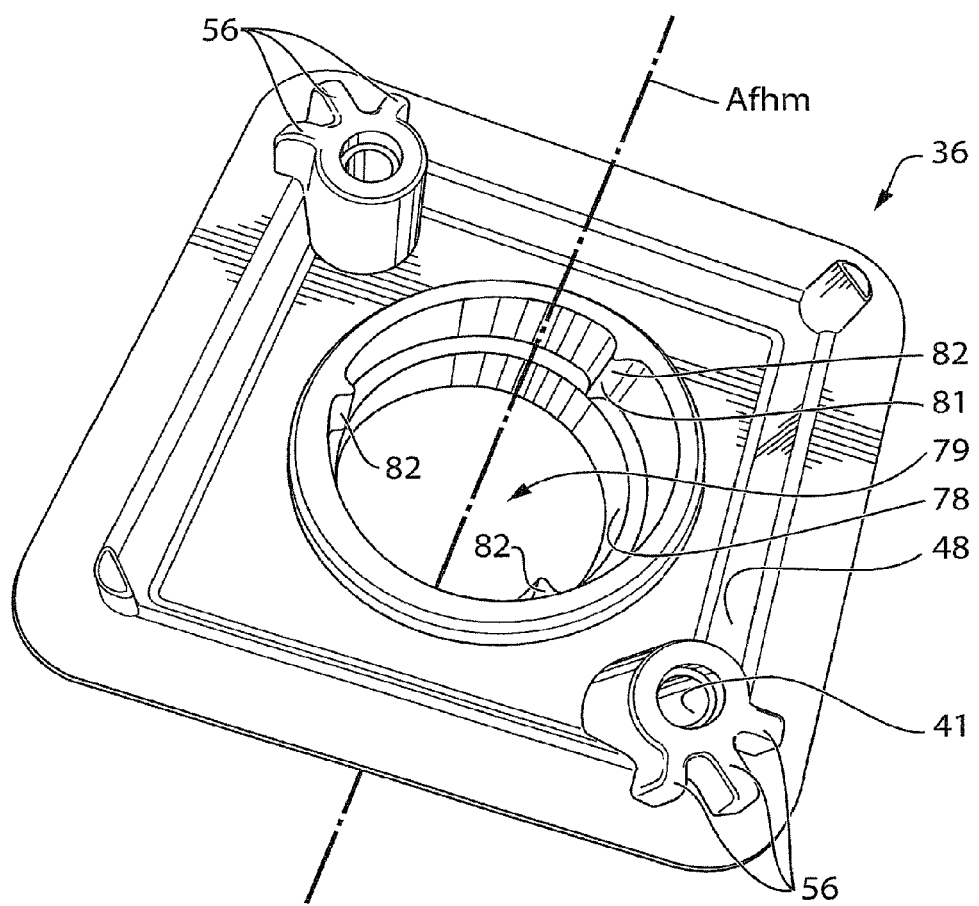
FIG. 2 is a perspective view of a front housing member that is part of the camera shown in FIGS. 1a and 1b.

While three engagement ribs 82 are shown in FIG. 2, it is, however, possible to have fewer or more lens member engagement ribs 82. For example, two engagement ribs could be provided, wherein each rib extends over an angular range instead of having an apex as shown for the ribs 82 shown FIG. 2.

While the engagement ribs 82 are shown as being on the front housing member locking portion 81, it is alternatively possible to provide them on the lens member locking portion 84.

It is optionally possible to omit the engagement ribs 82 and to simply provide an interference fit between two substantially cylindrical locking portions 81 and 84, however, it is contemplated that the use of engagement ribs 82 as shown in FIGS. 1b and 2 reduces the force required to rotate the lens member 32 to its optimal position for focusing images on the imaging element 33, while ensuring however, that the force required is sufficiently high to maintain a low likelihood of inadvertent movement of the lens member 32 during vehicle use.

Referring to FIG. 1b, providing the lens member engagement ribs 82 permits the lens member 32 to be held at a selected position in the front housing member 36 even at relatively high temperatures, such as a temperature that is greater than 85 degrees Celsius, that might reduce the effectiveness of the bonding agent 80 in embodiments where the bonding agent is provided. For greater clarity, it is optionally possible to omit the bonding agent 80 and to instead provide the lens member engagement ribs 82 as the primary means for holding the lens member 32 in place aside from the threaded portions 76 and 78.

The electrical conduits 46 may be bundled in a conduit sleeve 85 and may pass through an electrical conduit aperture 86 in the rear housing member 38. A seal member 88 may seal between the conduit sleeve 85 and the electrical conduit aperture 86. The seal member 88 may be any suitable type of seal member. For example, the seal member 88 may be a heat shrink member that is shrunk by application of heat to form a tightly sealed bond with the conduit sleeve 85 and rear housing member 38. The seal member 88 may further include a bonding agent, such as an adhesive on its interior wall to assist in bonding to the conduit sleeve 85 and rear housing member 38. In addition to providing a seal, the seal member 88 may further provide strain relief for the rear housing member 38, the conduit sleeve 85 and the electrical conduits 46 by providing some resistance to bending of the sleeve 85 and electrical conduits 46, and by providing some resistance to inadvertent withdrawal of the conduit sleeve 85 from the rear housing member 38.

Figure 3:
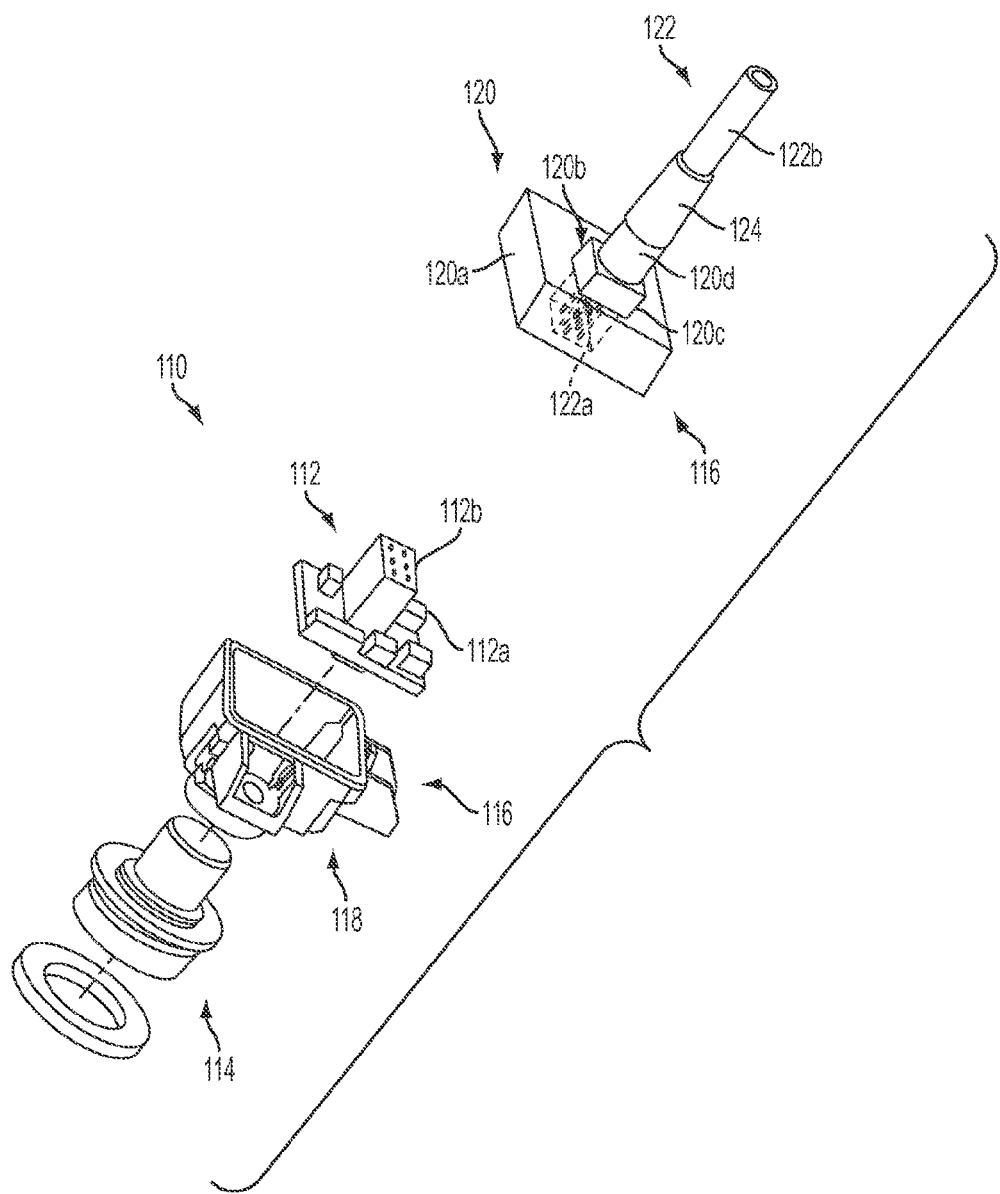
FIG. 3 is an exploded perspective view of an imaging device in accordance with another embodiment of the present invention.
Figure 4:
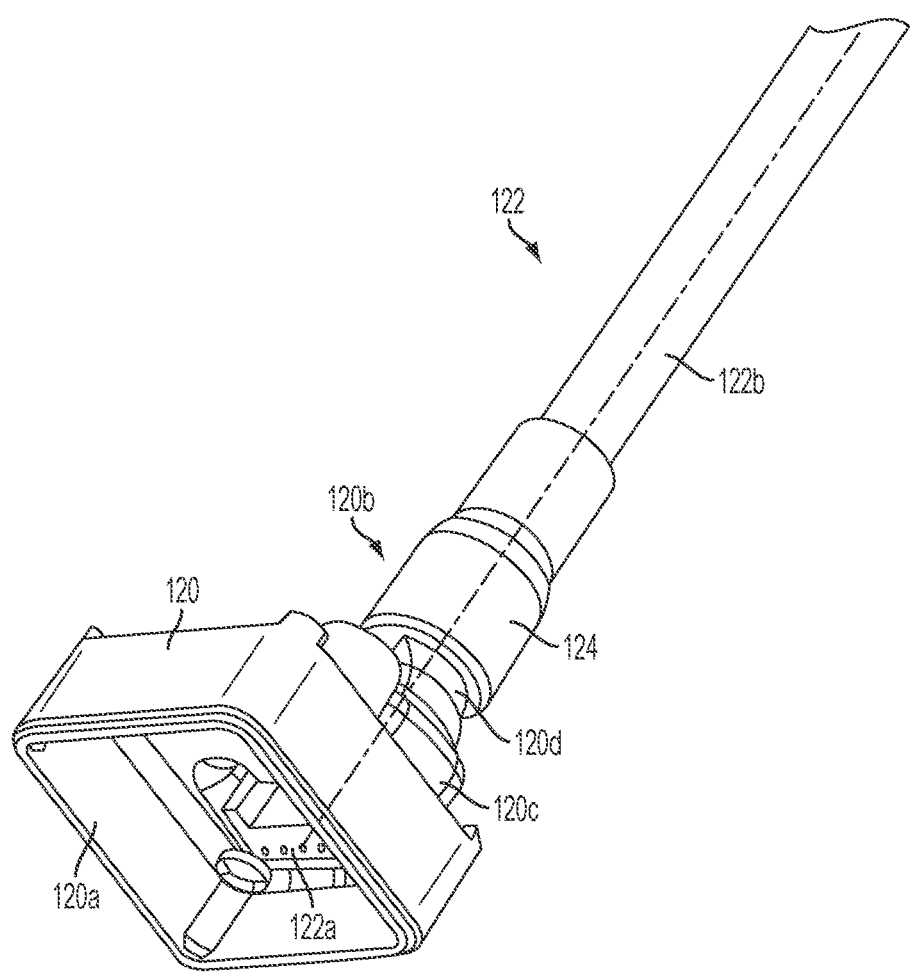
FIG. 4 is a perspective view of the cable and rear housing portion of the imaging device of FIG. 3.
Figure 5:
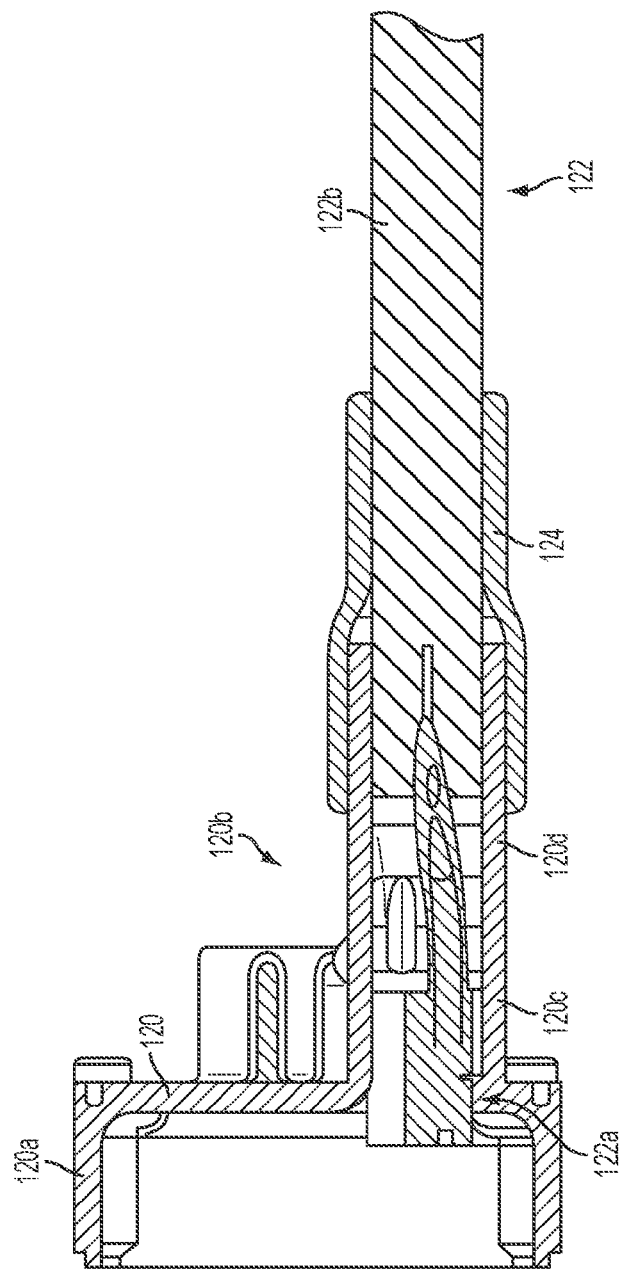
FIG. 5 is a sectional view of the cable and rear housing portion of FIG. 4.

Referring now to FIGS. 3-5 and the illustrative embodiments depicted therein, a camera or imaging device or module 110 is adapted for use on or in or at a vehicle and is associated with at least one vision system of the vehicle. Camera module 110 includes a circuit board or chip or element 112 (on which an imaging sensor and associated circuitry is established), a lens assembly 114 and a housing portion or outer shell 116. Housing portion 116 includes a front or lens receiving portion 118 and a rear or cable receiving portion 120 that are connected and sealed together (such as by laser welding or other suitable sealing means such as sonic welding or thermal sealing or adhesive sealing or mechanical sealing or the like) so that the housing portion encompasses or encases or houses the circuit board 112 and a portion of the lens assembly 114 to substantially or entirely encase or encapsulate the circuit board 112 and circuitry within the outer shell or housing portion 116. Camera module 110 also includes a cable or wire harness 122 that is electrically connected to the circuitry of circuit board 112 and that includes an electrical connector 122a (such as a multi-pin connector or plug or socket type connector or the like) at or within rear housing portion and an electrical wire or lead 122b that extends from rear housing portion 120 and that is electrically connectable to circuitry or a wire harness of the vehicle or the like, so as to provide power and communication and control between the vehicle and the camera module. The wire harness is received through and retained at rear housing portion 120 to provide enhanced sealing at the wire harness and housing portion junction, as discussed below.

As shown in FIG. 3, the lens assembly 114 may be received through and retained and sealed at the lens mounting portion or front housing portion 118 via any suitable retaining and sealing means. Lens assembly 114 is secured or attached to circuit board 112 such that the lens optic or optics function to focus and direct and refract an image of the scene at the field of view of the lens optics onto the imaging sensor. The lens assembly includes at least one optical element and the lens mounting element is attached to the circuit board so as to provide an optical path through the at least one optical element to the imaging sensor at the circuit board.

The circuit board or element 112 of camera or imaging device module 110 includes a camera or image capture device or sensor for capturing an image of a scene occurring exteriorly or interiorly of a vehicle. Camera module 110 may utilize aspects of the cameras or sensors described in U.S. patent application Ser. No. 12/091,359, filed Apr. 24, 2008 and published Oct. 1, 2009 as U.S. Publication No. US 2009-0244361; Ser. No. 10/534,632, filed May 11, 2005, now U.S. Pat. No. 7,965,336; and/or Ser. No. 11/201,661, filed Aug. 11, 2005 and published Feb. 23, 2006 as U.S. Publication No. US-2006-0038668, which are hereby incorporated herein by reference in their entireties. Optionally, the images captured by the imaging sensor may be communicated to a display or display system which is operable to display the images to a driver of the vehicle. The camera or imaging sensor useful with the present invention may comprise an imaging array sensor, such as a CMOS sensor or a CCD sensor or the like, such as disclosed in commonly assigned U.S. Pat. Nos. 5,550,677; 5,670,935; 5,796,094; 6,097,023 and/or 7,339,149, which are hereby incorporated herein by reference in their entireties.

In the illustrated embodiment, circuit board 112 is secured or attached or mounted to front housing portion or lens mounting portion 118 to form a circuit board sub-assembly. Circuit board 112 includes circuitry 112a, such as circuitry associated with the imaging sensor. When mounted to the front housing portion 118, circuit board 112 is received within the cavity or pocket defined by the outer walls of the front housing portion 118, with some of the circuitry being located at the opposite side or surface of the circuit board 112 from the lens receiving structure of front housing portion 118. As shown in FIG. 3, circuitry 112a includes a connecting element or header 112b (such as a multi-pin connector or plug or socket type connector or the like) for connecting to a connector or connecting element 122a of wire harness 122.

Wire harness 122 includes electrical connector 122a, such as a plug or socket type connector or the like, at an end of the wires or cable 122b for electrically connecting the wire harness to the connector 112b of circuit board 112. The connector 122a connects to (such as via plugging into) the connector 112b to electrically connect the wire harness to the circuitry of camera module 110, whereby the connector or connectors at the opposite end of wire harness 122 may electrically connect to an electrical connector of the vehicle, so as to provide power and control and signal communication to and from the camera module.

Optionally, the connector 122a of wire harness 122 may be connected to the connector 112b of circuit board 112 prior to or while connecting or mating the housing portions 118, 120 to substantially seal the connection of the wire harness and module. Such a sealed connection may provide a means for retaining the connection without a need for a locking feature at the connectors, and may reduce the strain or provide strain relief for the wire harness at the connection to the camera module.

In the illustrated embodiment, the rear housing portion or rear shell portion 120 includes a main wall portion 120a that defines the cavity of the camera housing or shell when the housing 116 is assembled. A cable receiving portion 120b extends rearward (or generally away from the circuitry 112 and lens assembly 114) from wall portion 120a and is formed to receive the end of the wire harness 122 therein. The cable receiving portion 120b includes a connector receiving portion 120c that is formed so as to receive the connector 122a therein and to retain the connector generally at the rear wall of wall portion 120a and generally facing the cavity of the camera housing. For example, the connector receiving portion may be generally rectangular-shaped for receiving and supporting or retaining a generally rectangular-shaped connector (although the connector receiving portion may have any other shape that is appropriate for or generally corresponds to the shape of the respective connector that is to be received therein). The cable receiving portion 120b also includes an outer generally tube portion 120d that is formed to receive the generally cylindrical cable 122b. For example, the hollow tubular cable receiving portion may be generally cylindrical-shaped for receiving and supporting or retaining a generally cylindrical-shaped cable (although the cable receiving portion may comprise any other shaped tube or hollow tubular element (such as a rectangular or square shaped tube or the like) that is appropriate for or that generally corresponds to the cross-sectional shape of the respective cable that is to be received therein and therethrough). Thus, the rear camera housing portion or shell portion 120 receives cable or wire harness 122 therein and retains connector 122a at a position where the connector 122a is supported for connection to the circuitry connector 112b when the rear housing or shell portion 120 is mated with the front housing or shell portion 118.

The shape of the cable receiving portion 120b thus holds the cable or wires 122b and the cable connector 122a in a desired or appropriate orientation for connecting the cable connector 122a to the circuitry connector or header 112b. Also, the shape of the cable receiving portion 120b retains the generally cylindrical cable portion or wires 122b at the desired or appropriate location and orientation relative to cable connector 122a, thereby reducing strain on the cable and connector when the cable is moved. Such a configuration also provides enhanced sealing at the cable to housing junction to provide enhanced performance and enhanced life cycles of the cameras in the field and when exposed to harsh environmental conditions.

Optionally, and desirably, the camera module 110 may include a wire sleeve 124 that may be positioned at the connector end of the wire harness to encapsulate or encase the wire harness whereby the wire sleeve may be shrink-wrapped around the end of the wire and a portion of the housing portion to encapsulate the end of the wire harness at the housing portion 120. The wire sleeve and housing portion thus substantially encase or encapsulate the electrical connection between the wire harness and the circuit board and may retain the connection and may reduce the strain at the connection of the wire harness to the circuit board of the camera module.

Thus, the present invention provides for plugging the wire harness directly into a PCB header or connector, which provides the most simple and direct electrical path. The housing or shell portion of the present invention provides a strategically shaped camera housing that receives the cable connector and is shaped around the cable connector interface and cable, and thus assures that the connector is properly oriented, properly installed and connected and fully seated with the PCB header or connector when the camera housing or shell is assembled. The housing geometry also provides off axis cable strain relief when it encloses a small portion of the cable end (the end of the cylindrical cable at the cable connector) in the form of a short cylindrical-shaped housing portion. The cylindrical housing feature also serves as an appropriate surface for a thick-walled automotive grade heat shrink tube to bridge across to from the cable. The heat shrink serves as both a seal between the camera housing and cable as well as cable strain relief. Such heat shrink tubes are inexpensive and commercially available in a variety of sizes and grades, and may include a pre-applied adhesive on the interior surface for adhering the tube in place at the housing and cable. When subjected to temperature extremes, heat shrink has a tendency to shrink more when possible, further enhancing the seal and bonds at the cable and camera housing or shell portion. The present invention thus provides a cost advantage over conventional cable exit strategies. Also, the present invention provides quality advantages as well.

Optionally, the housing or shell portion may comprise any suitable material, such as a plastic or polymeric material, or a metallic material, such as zinc, aluminum or magnesium, or the like. Optionally, the polymeric housing portion and/or the polymeric lens mounting portion may include conducting or non-conducting material, such as ferrous material or elements (preferably non-conductive ferrous elements), within or on the plastic material, so that the housing portion and/or lens mounting portion may provide shielding properties for EMC and thus enhanced performance of the camera module, such as described above.

The camera module and circuit chip or board and imaging sensor of the present invention may be implemented and operated in connection with various vehicular vision systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606 and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; and/or 6,320,176, and/or U.S. patent application Ser. No. 11/201,661, filed Aug. 11, 2005 and published Feb. 23, 2006 as U.S. Publication No. US-2006-0038668, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563 and 6,946,978, and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional application Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or PCT Application No. PCT/US03/40611, filed Dec. 19, 2003, and published Jul. 15, 2004 as PCT Publication No. WO 2004/058540, and/or U.S. patent application Ser. No. 10/538,724, filed Jun. 13, 2005 and published Mar. 9, 2006 as U.S. Publication No. US-2006-0050018, and/or U.S. provisional application Ser. No. 60/630,061, filed Nov. 22, 2004; and Ser. No. 60/667,048, filed Mar. 31, 2005, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. patent application Ser. No. 11/201,661, filed Aug. 11, 2005, now U.S. Pat. No. 7,480,149; and/or Ser. No. 11/226,628, filed Sep. 14, 2005 and published Mar. 23, 2006 as U.S. Publication No. US 2006-0061008, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577 and 7,004,606; and/or U.S. patent application Ser. No. 11/315,675, filed Dec. 22, 2005, now U.S. Pat. No. 7,720,580; and/or Ser. No. 10/534,632, filed May 11, 2005, now U.S. Pat. No. 7,965,336;

and/or U.S. provisional application Ser. No. 60/845,381, filed Sep. 18, 2007; and Ser. No. 60/837,408, filed Aug. 11, 2006, and/or PCT Application No. PCT/US2003/036177 filed Nov. 14, 2003, and published Jun. 3, 2004 as PCT Publication No. WO 2004/047421, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

Optionally, the camera or imaging device may be positioned at an interior rearview mirror assembly of the vehicle, and may be located in the mirror assembly and directed generally forwardly or rearwardly with respect to the direction of travel of the vehicle for providing an exterior field of view in the forward or rearward direction. Optionally, the camera or imaging device may be directed toward one or more locations within the vehicle cabin to provide an interior field of view, such as for a cabin monitoring system or the like.

While the above description constitutes a plurality of embodiments of the present invention, it will be appreciated that the present invention is susceptible to further modification and change without departing from the fair meaning of the accompanying claims.

The invention claimed is:

1. A vehicular camera assembly for a vision system of a vehicle, said vehicular camera assembly comprising:
   a front housing member;
   a lens assembly;
   wherein said lens assembly comprises at least one optical element;
   a circuit board having a first side and an opposing second side;
   an imaging element disposed on said first side of said circuit board;
   a plurality of electrical connectors disposed on said second side of said circuit board;
   said front housing member comprising a lens assembly receiving portion and a circuit board attachment portion;
   wherein said circuit board attachment portion of said front housing member has a generally rectangular shape and wherein said lens assembly receiving portion is coextensive with said circuit board attachment portion and extends outward therefrom with a cylindrical shape;
   wherein at least a portion of said lens assembly is cylindrically shaped;
   wherein said lens assembly receiving portion of said front housing member comprises an aperture dimensioned to receive said at least a portion of said lens assembly that is cylindrically shaped;
   wherein said lens assembly receiving portion of said front housing member is threaded and wherein said at least a portion of said lens assembly that is cylindrically shaped is threaded, and wherein, when being received at said lens assembly receiving portion of said front housing member, said lens assembly threads into said front housing member;
   wherein said circuit board attachment portion of said front housing member is configured for attachment of said circuit board thereat;
   wherein, with said circuit board attached at said front housing member, said first side of said circuit board with said imaging element disposed thereon is closer to said lens assembly than said second side of said circuit board with said plurality of electrical connectors disposed thereon;
   wherein, with said circuit board attached at said front housing member and with said lens assembly received at said lens assembly receiving portion of said front housing member, said lens assembly and said imaging element are distanced from one another, and wherein images are focused on said imaging element by said at least one optical element of said lens assembly;
   wherein a bonding agent bonds said lens assembly to said front housing member;
   a rear housing member;
   wherein said front housing member and said rear housing member are configured to be attached together; and
   wherein, with said front and rear housing members attached together, outer walls of said front and rear housing members enclose said circuit board.

2. The vehicular camera assembly of claim 1, wherein said bonding agent comprises an adhesive.

3. The vehicular camera assembly of claim 1, wherein said bonding agent comprises an epoxy adhesive.

4. The vehicular camera assembly of claim 1, wherein said bonding agent comprises a UV-cure adhesive.

5. The vehicular camera assembly of claim 4, wherein said bonding agent comprises an epoxy adhesive.

6. The vehicular camera assembly of claim 1, wherein said bonding agent comprises an adhesive, and wherein said adhesive, when cured, secures threads of said lens assembly to threads of said front housing member.

7. The vehicular camera assembly of claim 1, wherein said first and second housing members are formed of metallic material.

8. The vehicular camera assembly of claim 7, wherein said metallic material comprises at least one of zinc, aluminum and magnesium.

9. The vehicular camera assembly of claim 1, wherein said front and rear housing members are sealed together.

10. The vehicular camera assembly of claim 9, wherein said front and rear housing members are sealed together by at least one of (i) adhesive sealing and (ii) mechanical sealing.

11. The vehicular camera assembly of claim 1, wherein said rear housing member comprises a shaped receiving pocket configured to receive and retain a respectively-shaped cable connector therein.

12. The vehicular camera assembly of claim 1, wherein said vehicular camera assembly comprises a rearview camera for a vehicle and wherein said imaging element comprises a CMOS imaging sensor.

13. The vehicular camera assembly of claim 1, wherein said rear housing portion is configured to receive and retain a portion of a cable therein, and wherein a tube encompasses at least a portion of said cable, and wherein said tube substantially seals around said cable portion.

14. The vehicular camera assembly of claim 1, wherein, with said front and rear housing members attached together, a cable connects to said plurality of electrical connectors disposed on said second side of said circuit board.

15. The vehicular camera assembly of claim 14, wherein said rear housing member comprises a rectangular-shaped connector receiving portion configured to receive and retain a cable connector therein.

16. The vehicular camera assembly of claim 1, wherein said circuit board is attached at said circuit board attachment portion of said front housing member by a plurality of fasteners.

17. The vehicular camera assembly of claim 16, wherein said fasteners comprise screws.

18. A vehicular camera assembly for a vision system of a vehicle, said vehicular camera assembly comprising:
a front housing member;
a lens assembly;
wherein said lens assembly comprises at least one optical element;
a circuit board having a first side and an opposing second side;
an imaging element disposed on said first side of said circuit board;
wherein said imaging element comprises an imaging sensor;
a plurality of electrical connectors disposed on said second side of said circuit board;
said front housing member comprising a lens assembly receiving portion and a circuit board attachment portion;
wherein said lens assembly receiving portion of said front housing member comprises an aperture dimensioned to receive at least a portion of said lens assembly;
wherein said lens assembly receiving portion of said front housing member is threaded and wherein at least a portion of said lens assembly is threaded, and wherein, when being received at said lens assembly receiving portion of said front housing member, said lens assembly threads into said front housing member;
wherein said circuit board attachment portion of said front housing member is configured for attachment of said circuit board thereat;
wherein, with said circuit board attached at said front housing member, said first side of said circuit board with said imaging element disposed thereon is closer to said lens assembly than said second side of said circuit board with said plurality of electrical connectors disposed thereon;
wherein, with said circuit board attached at said front housing member and with said lens assembly received at said lens assembly receiving portion of said front housing member, said lens assembly and said imaging element are distanced from one another, and wherein images are focused on said imaging element by said at least one optical element of said lens assembly;
wherein an adhesive bonds said lens assembly to said front housing member, and wherein said adhesive, when cured, secures threads of said lens assembly to threads of said front housing member;
a rear housing member;
wherein said front housing member and said rear housing member are configured to be attached together; and
wherein, with said front and rear housing members attached together, outer walls of said front and rear housing members enclose said circuit board.

19. The vehicular camera assembly of claim 18, wherein said front and rear housing members are sealed together.

20. The vehicular camera assembly of claim 19, wherein said front and rear housing members are sealed together by at least one of (i) laser welding and (ii) sonic welding.

21. The vehicular camera assembly of claim 19, wherein said first and second housing members are formed of metallic material.

22. The vehicular camera assembly of claim 21, wherein said metallic material comprises at least one of zinc, aluminum and magnesium.

23. The vehicular camera assembly of claim 18, wherein said circuit board attachment portion of said front housing member has a generally rectangular shape.

24. A vehicular camera assembly for a vision system of a vehicle, said vehicular camera assembly comprising:
a front housing member;
a lens assembly;
wherein said lens assembly comprises at least one optical element;
a circuit board having a first side and an opposing second side;
an imaging element disposed on said first side of said circuit board;
wherein said imaging element comprises a CMOS imaging sensor;
at least one electrical connector disposed on said second side of said circuit board;
said front housing member comprising a lens assembly receiving portion and a circuit board attachment portion;
wherein said lens assembly receiving portion of said front housing member comprises an aperture dimensioned to receive at least a portion of said lens assembly;
wherein said lens assembly receiving portion of said front housing member is threaded and wherein at least a portion of said lens assembly is threaded, and wherein, when being received at said lens assembly receiving portion of said front housing member, said lens assembly threads into said front housing member;
wherein said circuit board attachment portion of said front housing member is configured for attachment of said circuit board thereat;
wherein said circuit board attachment portion of said front housing member has a generally rectangular shape;
wherein, with said circuit board attached at said front housing member, said first side of said circuit board with said imaging element disposed thereon is closer to said lens assembly than said second side of said circuit board with said at least one electrical connector disposed thereon;
wherein, with said circuit board attached at said front housing member and with said lens assembly received at said lens assembly receiving portion of said front housing member, said lens assembly and said imaging element are distanced from one another, and wherein images are focused on said imaging element by said at least one optical element of said lens assembly;
wherein an adhesive bonds said lens assembly to said front housing member;
a rear housing member;
wherein said front housing member and said rear housing member are configured to be attached together;
wherein, with said front and rear housing members attached together, outer walls of said front and rear housing members enclose said circuit board;
wherein said front and rear housing members are sealed together; and
wherein said vehicular camera assembly comprises a rearview camera for a vehicle.

25. The vehicular camera assembly of claim 24, wherein said circuit board is attached at said circuit board attachment portion of said front housing member by a plurality of fasteners.

26. The vehicular camera assembly of claim 25, wherein said fasteners comprise screws.

27. The vehicular camera assembly of claim 24, wherein the at least a portion of said lens assembly that is threaded is cylindrically shaped.

28. The vehicular camera assembly of claim 24, wherein said adhesive comprises a UV-cure adhesive.

29. The vehicular camera assembly of claim 24, wherein said adhesive comprises an epoxy adhesive.

30. The vehicular camera assembly of claim 24, wherein said front and rear housing members are sealed together by at least one of (i) laser welding, (ii) sonic welding, (iii) thermal sealing and (iv) adhesive sealing.

31. The vehicular camera assembly of claim 24, wherein said first and second housing members are formed of metallic material.

32. The vehicular camera assembly of claim 31, wherein said first and second housing members are formed of zinc.

33. The vehicular camera assembly of claim 31, wherein said first and second housing members are formed of magnesium.

34. The vehicular camera assembly of claim 24, wherein said adhesive, when cured, secures threads of said lens assembly to threads of said front housing member.

\* \* \* \* \*